Nov. 23, 1954
M. J. ALGER, JR
2,694,997
DEVICE FOR INDICATING OVERHEATED BEARINGS
Filed Dec. 15, 1952
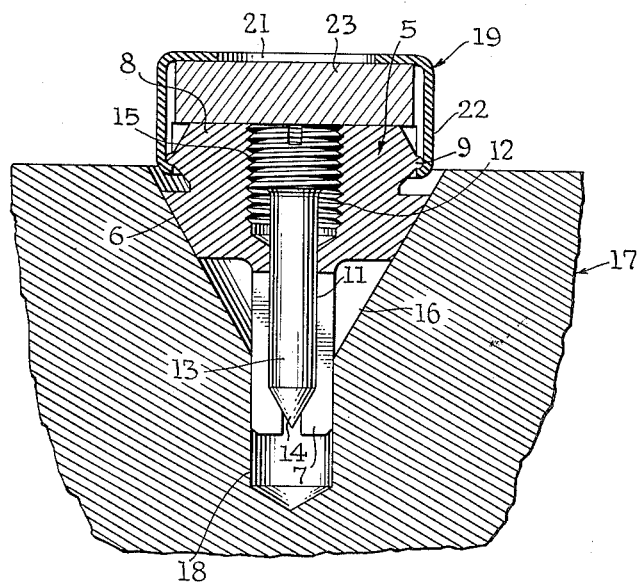
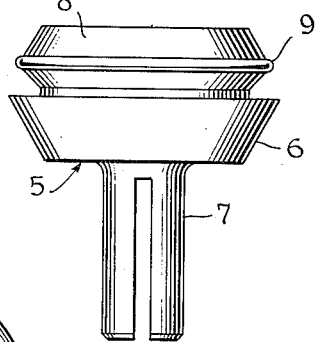
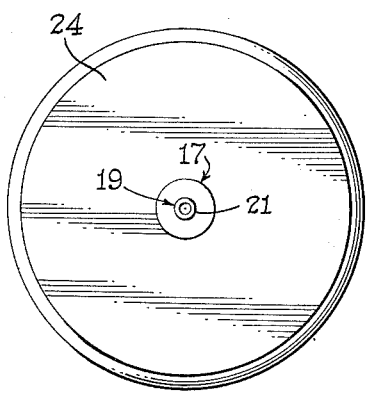
INVENTOR
Martin J. Alger, Jr.
BY
ATTORNEYS

United States Patent Office 2,694,997
Patented Nov. 23, 1954

2,694,997

DEVICE FOR INDICATING OVERHEATED BEARINGS

Martin J. Alger, Jr., Watertown, N. Y., assignor to The New York Air Brake Company, a corporation of New Jersey Application December 15, 1952, Serial No. 326,060

2 Claims. (Cl. 116—106)

This invention relates to signal devices. Specifically it relates to means for indicating that a bearing has become overheated and may be defective or in need of lubrication.

Signal devices for this purpose are particularly useful as an indication that the journal bearing of a railroad car has become overheated. It will be described as used for this purpose, although it will be understood that this is not the only application of the device.

The signal device embodying the present invention comprises a mounting assembly adapted for permanent attachment on the journalled axle. During machining of these axles they are mounted on centers in lathes, and the centering holes remain in the finished axle. The American Association of Railroads has recommended that these centering holes be of a standard size, in order to facilitate mounting these axles on centers for maintenance purposes. The mounting assembly embodying the present invention comprises a body portion having a conical surface dimensioned so as to fit the conical surface of the standard centering holes. A plurality of flexible fingers extends axially from the main body and are received in the axial counterbore characteristic of such centering holes. An axially movable wedge is inserted through the base of the conical body portion and urges the flexible fingers radially outward into engagement with the surface of the counterbore. A mounting boss extends outward from the base of the body portion. A snap retainer cap is fitted to this boss. The retainer cap retains a wafer of fusible material between it and the outer face of the mounting boss. The cap preferably has a central aperture. The outer face of the boss is colored so that it contrasts with the color of the wafer. For example it may be colored red and the wafer made in some neutral color. These colors may advantageously be reversed particularly if the cap is provided with radial apertures through which the melted wafer may be dissipated by centrifugal force. If the wafer is dyed a distinctive color, the radial ports may be arranged so that the melted substance stains the hub of the wheel. It will be apparent that either or both methods of indicating the melting of the wafer can be used.

A preferred embodiment of the invention will be described having reference to the accompanying drawing in which:

Figure 1 is a fragmentary axial sectional showing a portion of the journal member and the signal device mounted thereon.

Figure 2 is an elevation of the mounting assembly.

Figure 3 is a side elevation of the retainer cap.

Figure 4 is an elevation of a wheel and axle assembly with the indicator mounted thereon.

Referring first to Figure 2 the mounting assembly comprises a body 5 having a conical bearing surface 6. Extending axially from the body 5 is a plurality of flexible fingers 7, the outer longitudinal surfaces of which are formed as cylindrical segments. Projecting outward from the body 5 is a mounting boss 8. A circumferential ridge 9 encircles the boss 8. As shown in Figure 1 the body 5 has a bore 11 therethrough. The bore 11 has an outer, enlarged threaded portion 12. The bore 11 receives a wedging pin 13 having a tapered portion 14. Pin 13 includes a threaded head 15 and may be driven into position. The tapered portion 14 engages corresponding surfaces on the fingers 7 and wedges the fingers radially outward.

The body 5 is inserted into the centering hole 16 of the journal 17 so that the conical surface 6 engages the flared surface of the hole 16 and the fingers 7 are received in the bore 18. The pin 13 is then driven into place and the fingers 7 are forced into engagement with the bore 18.

After the body 5 has been secured in place a cap 19 is snapped into place on the rib 9. The cap 19 includes a central aperture 21 in its outer face and a plurality of spring fingers 22 (see Fig. 3) which engage the rib 9. A wafer 23 is retained in place against the outer face of the boss 8 by the cap 19. The wafer 23 consists of a fusible substance having a melting point which corresponds to the maximum normal operating temperature of the journal 17. Such substances are commercially available.

The mounting of the device in the center of the journal of a wheel and axle assembly will be abundantly clear from Figure 4. The wheel appears at 24.

The operation of the device will be apparent from its construction. The assembly mounted as described in the journal 17 is heated, during operation, to a temperature which corresponds closely to that of the journal. If the journal becomes overheated, the wafer 23 will be melted and the outer end of the boss 8 is exposed through the aperture 21. The melted wafer material escapes from the cap 19 between the fingers 22. The cap 19 could be made with a continuous skirt instead of fingers 22 in which case openings should be provided to permit escape of the fused material.

As stated earlier either the wafer 23 or the outer face of the boss 8 or both may be distinctively colored. The colored wafer 23 may be caused to stain the hub of the wheel attached to the journal 17 when it is fused and is thrown outward from the cap 19 by centrifugal force.

It will be seen that a permanent signal is afforded by the invention, and there are no moving parts which require maintenance. The signal device can be restored to operative condition by the removal of the cap 19, insertion of a new wafer 23 and replacement of cap 19.

What is claimed is:

1. A device to indicate overheating of a journal having a longitudinal counterbore comprising in combination with said counterbore a body portion having a plurality of resilient fingers; means urging said fingers into engagement with said counterbore, said body including a boss projecting axially outward; a cap including resilient means engaging said boss; and a fusible wafer retained between said boss and said cap, said cap having at least one radial opening through which the wafer material may be dissipated when melted by excessive journal temperature.

2. The combination defined in claim 1 in which the outer face of said cap includes an aperture through which the condition of said wafer may be visually determined.

References Cited in the file of this patent
UNITED STATES PATENTS

| Number | Name | Date |
|--------|------|------|
| 2,203,051 | Green | June 4, 1940 |
| 2,503,593 | Pearce | Apr. 11, 1950 |